United States Patent [19]

Matsuura et al.

[11] Patent Number: 4,537,938
[45] Date of Patent: Aug. 27, 1985

[54] PROCESS FOR PREPARING POLYOLEFINS

[75] Inventors: Kazuo Matsuura, Ota; Yutaka Shikatani, Yokohama; Hirofumi Kamiishi, Yokohama; Nobuyuki Kuroda, Yokohama; Mituji Miyoshi, Fujisawa, all of Japan

[73] Assignee: Nippon Oil Company, Limited, Tokyo, Japan

[21] Appl. No.: 591,912

[22] Filed: Mar. 21, 1984

[30] Foreign Application Priority Data

Mar. 29, 1983 [JP] Japan ................... 58-51585

[51] Int. Cl.³ .................. C08F 4/44; C01B 15/14
[52] U.S. Cl. .................... 526/97; 526/114;
526/115; 526/122; 526/125; 526/128; 526/348;
526/907; 502/134; 502/158; 423/325; 423/341
[58] Field of Search ............... 526/97, 114, 115, 116,
526/121, 124, 125, 128, 122

[56] References Cited

U.S. PATENT DOCUMENTS 4,396,534 8/1983 Matsuura et al. ............ 526/125
4,451,688 5/1984 Kuroda et al. .............. 526/128 X

FOREIGN PATENT DOCUMENTS 2068007 8/1981 United Kingdom ............ 526/128

Primary Examiner—Joseph L. Schofer
Assistant Examiner—Fred Teskin
Attorney, Agent, or Firm—Stevens, Davis, Miller & Mosher

[57] ABSTRACT

Provided is an olefin-polymerization catalyst comprising the combination of the following components [I] and [II]:

[I] a solid component obtained by intercontacting and reacting the following components (1) through (4):

(1) a compound obtained by treating an oxide of an element of Groups II–IV in the Periodic Table with a compound represented by the general formula $R^1{}_mSi(OR^2)_nX_{4-m-n}$ wherein $R^1$ and $R^2$ are each a hydrocarbon radical having 1 to 24 carbon atoms, a hydrocarbon radical containing oxygen, sulfur or nitrogen, or hydrogen, X is a halogen atom, m is $0 \leq m < 4$ and n is $0 \leq n \leq 4$, provided $0 \leq m+n \leq 4$, (2) a reaction product obtained by the reaction of a magnesium halide and a compound represented by the general formula $Me(OR^3)_nX_{z-n}$ wherein Me is an element of Groups I–VIII in the Periodic Table, with the limitation that silicon, titanium and vanadium are excluded, $R^3$ is a hydrocarbon radical having 1 to 24 carbon atoms, X is a halogen atom, z is the valence of Me, and n is $0 < n \leq z$, (3) a compound represented by the general formula

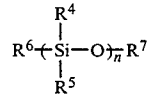

wherein $R^4$, $R^5$ and $R^6$ are each a hydrocarbon radical having 1 to 24 carbon atoms, an alkoxyl group, hydrogen, or a halogen atom, $R^7$ is a hydrocarbon radical having 1 to 24 carbon atoms, and n is $1 \leq n \leq 30$, and (4) a titanium compound and/or a vanadium compound; and

[II] an organometallic compound.

6 Claims, No Drawings

PROCESS FOR PREPARING POLYOLEFINS

BACKGROUND OF THE INVENTION

The present invention relates to a process for preparing polyolefins using a novel polymerization catalyst.

In this technical field, a catalyst comprising a magnesium halide and a transition metal compound such as a titanium compound supported thereon has heretofore been known as described in Japanese Patent Publication No. 12105/1964. Also, a catalyst prepared by the copulverization of a magnesium halide and titanium tetrachloride is known from Belgian Pat. No. 742,112.

However, when viewed from the standpoint that the catalytic activity is desired to be as high as possible in the manufacture of polyolefins, the process disclosed in the Japanese Patent Publication No. 12105/1964 is still unsatisfactory because of a low polymerization activity, while the polymerization activity attained in the process of the Belgian Pat. No. 742,112 is fairly high, but a further improvement is desired.

In the process disclosed in German Pat. No. 2137872, the amount of a magnesium halide used is substantially decreased by the co-pulverization thereof with titanium tetrachloride and alumina, but a remarkable increase in activity per solid, which can be regarded as a guideline for productivity, is not recognized, and it is desired to develop a catalyst of a higher activity.

In the manufacture of polyolefins, moreover, it is also desirable from the aspects of productivity and handling that the bulk density of the resulting polymer be as high as possible. From this standpoint, the process disclosed in the Japanese Patent Publication No. 12105/1964 is not satisfactory in both the bulk density of the resulting polymer and polymerization activity, while in the process disclosed in the Belgian Pat. No. 742,112, the polymerization activity is high, but the bulk density of the resulting polymer is low. Thus, in both the processes, a further improvement is desired.

SUMMARY OF THE INVENTION

It is the object of the present invention to provide a novel polymerization catalyst and a process for the homopolymerization or copolymerization of olefins using the catalyst, capable of remedying the above-mentioned drawbacks, attaining a high polymerization activity, affording polymers of high bulk densities in high yields and conducting a continuous polymerization extremely easily.

The present invention resides in a process for preparing a polyolefin, characterized by polymerizing at least one olefin in the presence of a catalyst, which catalyst comprises the combination of the following components [I] and [II]:

[I] a solid component obtained by intercontacting and reacting the following components (1) through (4):
(1) a compound obtained by treating an oxide of an element of Groups II–IV in the Periodic Table with a compound represented by the general formula $R^1_m Si(OR^2)_n X_{4-m-n}$ wherein $R^1$ and $R^2$ are each a hydrocarbon radical having 1 to 24 carbon atoms, a hydrocarbon radical containing oxygen, sulfur or nitrogen, or hydrogen, X is a halogen atom, m is $0 \leq m < 4$ and n is $0 \leq n \leq 4$, provided $0 \leq m+n \leq 4$,
(2) a reaction product obtained by the reaction of a magnesium halide and a compound represented by the general formula $Me(OR^3)_n X_{z-n}$ wherein Me is an element of Groups I–VIII in the Periodic Table, with the limitation that silicon, titanium and vanadium are excluded, $R^3$ is a hydrocarbon radical having 1 to 24 carbon atoms, X is a halogen atom, z is the valence of Me, and n is $0 < n \leq z$,
(3) a compound represented by the general formula

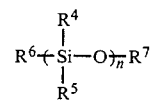

wherein $R^4$, $R^5$, and $R^6$ are each a hydrocarbon radical having 1 to 24 carbon atoms, an alkoxyl group, hydrogen, or a halogen atom, $R^7$ is a hydrocarbon radical having 1 to 24 carbon atoms, and n is $1 \leq n \leq 30$, and
(4) a titanium compound and/or a vanadium compound; and
[II] an organometallic compound or a mixture or reaction product of the organometallic compound and a compound represented by the general formula

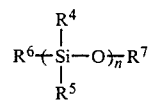

wherein $R^4$, $R^5$, $R^6$, $R^7$ and n are as defined above.

Since the catalyst of the present invention exhibits a very high polymerization activity, the partial pressure of monomer during polymerization is low, and because of a high bulk density of the resulting polymer, the productivity can be improved. Moreover, the amount of the catalyst remaining in the resulting polymer is so small that the polyolefin manufacturing process can dispense with the catalyst removing step, which leads to simplification of the polymer treating step, and consequently polyolefins can be prepared very economically.

Another advantage of the process of the invention is that the bulk density of the polymer being greater, there is obtained greater yield of polymer per unit polymerization reactor.

The present invention is further advantageous in that when viewed from the standpoint of particle size of the resulting polymer, the proportion of coarse particles and that of fine particles below 50 μm are small despite a high bulk density of the polymer, and that therefore not only it becomes easy to perform a continuous polymerization reaction but also the centrifugal separation in the polymer treating step as well as the handling of polymer particles in powder transport become easy.

According to the present invention, in addition to the high bulk density of polyolefins obtained by using the catalyst of the invention as previously noted, polyolefins having a desired melt index can be prepared at a lower hydrogen concentration than in conventional methods, thus permitting polymerization to be carried out at a relatively small total pressure, and this greatly contributes to the improvement of economy and productivity.

Additionally, in the olefin polymerization using the catalyst of the present invention, the olefin absorbing rate does not decrease so much even with the lapse of time, and therefore the polymerization can be conducted for a long time in a small amount.

Furthermore, polymers prepared by using the catalyst of this invention have a very narrow molecular weight distribution and their hexane extraction is small, and thus the by-production of low grade polymers is kept to a minimum. As a result, for example in the film grade, it is possible to obtain a high quality product superior in the anti-blocking property.

DESCRIPTION OF THE PREFERRED EMBODIMENTS

Examples of the oxide of an element of Groups II-IV in the Periodic Table which is a component of the catalyst used in the present invention, include not only oxides of individual elements of Groups II-IV in the Periodic Table, but also double oxides of those elements, as well as mixtures thereof, such as MgO, CaO, ZnO, $B_2O_3$, $Al_2O_3$, $SiO_2$, $SnO_2$, $Al_2O_3 \cdot MgO$, $Al_2O_3 \cdot CaO$, $Al_2O_3 \cdot SiO_2$, $SiO_2 \cdot MgO$, $SiO_2 \cdot CaO$, $Al_2O_3 \cdot MgO \cdot CaO$ and $Al_2O_3 \cdot MgO \cdot SiO_2$, with $SiO_2$, $Al_2O_3$ and $SiO_2 \cdot Al_2O_3$ being particularly preferred. These formulae are not molecular formulae, but represent only compositions, and their structures and component ratios are not specially limited. As a matter of course, the oxide used in the invention may contain a small amount of water adsorbed thereon and small amounts of impurities.

To exemplify the compound of the general formula $R^1_m Si(OR^2)_n X_{4-m-n}$ used in the invention, wherein $R^1$ and $R^2$ are each a hydrocarbon radical having 1 to 24, preferably 1 to 18, carbon atoms, a hydrocarbon radical containing oxygen, sulfur or nitrogen, or hydrogen, X is a halogen atom, m is $0 \leq m < 4$ and n is $0 \leq n \leq 4$, provided $0 \leq m+n \leq 4$, mention may be made of the following: silicon tetrachloride, monomethyltrichlorosilane, dimethyldichlorosilane, trimethylmonochlorosilane, monoethyltrichlorosilane, diethyldichlorosilane, triethylmonochlorosilane, monopropyltrichlorosilane, dipropyldichlorosilane, mono-n-butyltrichlorosilane, di-n-butyldichlorosilane, tri-n-butylmonochlorosilane, monophenyltrichlorosilane, diphenyldichlorosilane, triphenylmonochlorosilane, monopentyltrichlorosilane, dipentyldichlorosilane, tripentylmonochlorosilane, monooctyltrichlorosilane, monodecyltrichlorosilane, monomyristyltrichlorosilane, monostearyltrichlorosilane, monomethoxytrichlorosilane, monoethoxytrichlorosilane, monoisopropoxytrichlorosilane, mono-n-butoxytrichlorosilane, monopentoxytrichlorosilane, monooctoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane, tetraisopropoxysilane, tetra-n-butoxysilane, tetraisobutoxysilane, tetrapentoxysilane, monomethyltrimethoxysilane, monomethyltriethoxysilane, monomethyltri-n-butoxysilane, monomethyltri-sec-butoxysilane, monomethyltriisopropoxysilane, monomethyltriocotoxysilane, monomethyltristearoxysilane, monomethyltriphenoxysilane, dimethyldimethoxysilane, dimethyldiethoxysilane, dimethyldiisopropoxysilane, dimethyldiphenoxysilane, trimethylmonomethoxysilane, trimethylmonoethoxysilane, trimethylmonoisopropoxysilane, trimethylmonophenoxysilane, monomethyldimethoxymonochlorosilane, monomethyldiethoxymonochlorosilane, monomethylmonoethoxydichlorosilane, monomethyldiethoxymonobromosilane, monomethyldiphenoxymonochlorosilane, dimethylmonoethoxymonochlorosilane, monoethyltrimethoxysilane, monoethyltriethoxysilane, monoethyltriisopropoxysilane, monoethyltriphenoxysilane, diethyldimethoxysilane, diethyldiethoxysilane, diethyldiphenoxysilane, triethylmonomethoxysilane, triethylmonoethoxysilane, triethylmonophenoxysilane, monoethyldimethoxymonochlorosilane, monoethyldiethoxymonochlorosilane, monoethyldiphenoxymonochlorosilane, monoisopropyltrimethoxysilane, mono-n-butyltrimethoxysilane, mono-n-butyltriethoxysilane, mono-sec-butyltriethoxysilane, monophenyltriethoxysilane, diphenyldiethoxysilane, diphenylmonoethoxymonochlorosilane, vinyltrimethoxysilane, vinyltriethoxysilane, vinyltriphenoxysilane, vinyltris(2-methoxyethoxy)silane, allyltrimethoxysilane, allyltriethoxysilane, allyltriphenoxysilane, $\beta$-mercaptoethyltriethoxysilane, $\gamma$-mercaptopropyltrimethoxysilane, $\gamma$-aminopropyltriethoxysilane, $\gamma$-glycidoxypropyltrimethoxysilane, and $\beta$-(3,4-epoxycyclohexyl)ethyltrimethoxysilane.

The method of treating the oxide of an element of Groups II-IV in the Periodic Table with the compound of the general formula $R^1_m Si(OR^2)_n X_{4-m-n}$ is not specially limited. For example, the latter may be used in amount of $10^{-5}$ to 5 mols, preferably 0.0001 to 2 mol, most preferably 0.01 to 1 mol, per gram of the former, and both may be mixed and reacted under heating at a temperature in the range of 0° to 500° C., preferably 30° to 200° C., for 10 minutes to 24 hours, preferably 1 to 5 hours, in the presence or absence of a solvent which dissolves the compound of the above general formula. The reaction product may be washed with an inert solvent, or excess compound of the above general formula and the solvent may be removed by drying under reduced pressure. The oxide used in the above reaction may be calcined at 200°-800° C. in advance to remove the adsorbed water.

As the magnesium halide used in the present invention, a substantially anhydrous one is used, examples of which are magnesium fluoride, magnesium chloride, magnesium bromide and magnesium iodide, with magnesium chloride being particularly preferred. These magnesium halides may be treated beforehand with electron donors such as alcohols, esters, ketones, carboxylic acids, ethers, amines and phosphines.

To exemplify the compound of the general formula $Me(OR^3)_n X_{z-n}$ used in the invention, wherein Me is an element of Groups I-VIII in the Periodic Table, with the limitation that silicon, titanium and vanadium are excluded, $R^3$ is a hydrocarbon radical having 1 to 24 carbon atoms, X is a halogen atom, z is the valence of Me, and n is $0 < n \leq z$, mention may be made of the following: $NaOR^3$, $Mg(OR^3)_2$, $Mg(OR^3)X$, $Ca(OR^3)_2$, $Zn(OR^3)_2$, $Zn(OR^3)X$, $Cd(OR^3)_2$, $Al(OR^3)_3$, $Al(OR^3)_2X$, $B(OR^3)_3$, $B(OR^3)_2X$, $Ga(OR^3)_3$, $Ge(OR^3)_4$, $Sn(OR^3)_4$, $P(OR^3)_3$, $Cr(OR^3)_3$, $Mn(OR^3)_2$, $Fe(OR^3)_2$, $Fe(OR^3)_3$, $Co(OR^3)_2$, and $Ni(OR^3)_2$. More concrete examples are $NaOC_2H_5$, $NaOC_4H_9$, $Mg(OCH_3)_2$, $Mg(OC_2H_5)_2$, $Mg(OC_3H_7)_2$, $Ca(OC_2H_5)_2$, $Zn(OC_2H_5)_2$, $Zn(OC_2H_5)Cl$, $Al(OCH_3)_3$, $Al(OC_2H_5)_3$, $Al(OC_2H_5)_2Cl$, $Al(OC_3H_7)_3$, $Al(OC_4H_9)_3$, $Al(OC_6H_5)_3$, $B(OC_2H_5)_3$, $B(OC_2H_5)_2Cl$, $P(OC_2H_5)_3$, $P(OC_6H_5)_3$, and $Fe(OC_4H_9)_3$. Compounds of the general formulae $Mg(OR^3)_n X_{2-n}$, $Al(OR^3)_n X_{3-n}$ and $B(OR^3)_n X_{3-n}$ are particularly preferred, and as $R^3$ are especially preferred alkyl groups of $C_1$ to $C_4$ and phenyl.

The method of reacting the magnesium halide with the compound of the general formula $Me(OR^3)_nX_{3-n}$ is not specially limited. Both may be mixed and reacted in an organic solvent such as an inert hydrocarbon, an alcohol, an ether, a ketone, or an ester, under heating at a temperature in the range of 20° to 400° C., preferably 50° to 300° C., for 5 minutes to 10 hours. Alternatively, the reaction may be carried out by a co-pulverization treatment. The adoption of a co-pulverization treatment is particularly preferred in the present invention.

The apparatus to be used for the co-pulverization is not specially limited. Usually employed is a ball mill, a vibration mill, a rod mill, or an impact mill. Conditions for the co-pulverization such as temperature and time can be decided easily by those skilled in the art according to the co-pulverization method used. In general, the co-pulverization is performed at a temperature in the range of 0° to 200° C., preferably 20° to 100° C., for a period of time in the range of 0.5 to 50 hours, preferably 1 to 30 hours. Of course, the co-pulverizing operation should be performed in an inert gas atmosphere, and moisture should be avoided.

The reaction ratio of the magnesium halide and the compound of the general formula $Me(OR^3)_nX_{z-n}$ is in the range of 1:0.01 to 1:10, preferably 1:0.05 to 1:1, most preferably 1:0.1 to 0.5, in terms of Mg:Me (molar ratio).

To exemplify the compound of the general formula

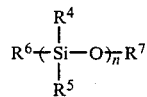

used in the invention, wherein $R^4$, $R^5$ and $R^6$ are each a hydrocarbon radical having 1 to 24, preferably 1 to 18, carbon atoms, an alkoxy group, hydrogen, or a halogen atom, $R^7$ is a hydrocarbon radical having 1 to 24, preferably 1 to 18, carbon atoms, with alkyl groups being preferred as hydrocarbon radicals, and n is $1 \leq n \leq 30$, mention may be made of the following: monomethyltrimethoxysilane, monomethyltriethoxysilane, monomethyltri-n-butoxysilane, monomethyltri-sec-butoxysilane, monomethyltriisopropoxysilane, monomethyltripentoxysilane, monomethyltrioctoxysilane, monomethyltristearoxysilane, monomethyltriphenoxysilane, dimethyldimethoxysilane, dimethyldiethoxysilane, dimethyldiisopropoxysilane, dimethyldiphenoxysilane, trimethylmonomethoxysilane, trimethylmonoethoxysilane, trimethylmonoisopropoxysilane, trimethylmonophenoxysilane, monomethyldimethoxymonochlorosilane, monomethyldiethoxymonochlorosilane, monomethylmonoethoxydichlorosilane, monomethyldiethoxymonobromosilane, monomethyldiphenoxymonochlorosilane, dimethylmonoethoxymonochlorosilane, monoethyltrimethoxysilane, monoethyltriethoxysilane, monoethyltriisopropoxysilane, monoethyltriphenoxysilane, diethyldimethoxysilane, diethyldiethoxysilane, diethyldiphenoxysilane, triethylmonomethoxysilane, triethylmonoethoxysilane, triethylmonophenoxysilane, monoethyldimethoxymonochlorosilane, monoethyldiethoxymonochlorosilane, monoethyldiphenoxymonochlorosilane, monoisopropyltrimethoxysilane, mono-n-butyltrimethoxysilane, mono-n-butyltriethoxysilane, monophenyltriethoxysilane, diphenyldiethoxysilane, diphenylmonoethoxymonochlorosilane, monomethoxytrichlorosilane, monoethoxytrichlorosilane, monoisopropoxytrichlorosilane, mono-n-butoxytrichlorosilane, monopentoxytrichlorosilane, monooctoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane, tetraisopropoxysilane, tetra-n-butoxysilane, tetrapentoxysilane, as well as chain or cyclic polysiloxanes having a recurring unit represented by the formula

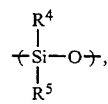

obtained by condensation of the compounds just exemplified above. Mixtures thereof are also employable.

Examples of the titanium compound and/or vanadium compound used in the present invention include halides, alkoxyhalides, alkoxides and halogenated oxides, of titanium and/or vanadium. As preferred examples of the titanium compound, there may be mentioned tetravalent and trivalent titanium compounds. As tetravalent titanium compounds, those represented by the general formula $Ti(OR)_nX_{4-n}$ are preferred wherein R is an alkyl, aryl or aralkyl group having 1 to 20 carbon atoms, X is a halogen atom and n is $0 \leq n \leq 4$, such as titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, and tetraphenoxytitanium. As trivalent titanium compounds there may be used, for example, titanium trihalides obtained by reducing titanium tetrahalides such as titanium tetrachloride and titanium tetrabromide with hydrogen, aluminum, titanium or organometallic compounds of Group I-III metals in the Periodic Table, as well as trivalent titanium compounds obtained by reducing tetravalent alkoxytitanium halides of the general formula $Ti(OR)_mX_{4-m}$ with organometallic compounds of Group I-III metals in the Periodic Table, in which formula R is an alkyl, aryl or aralkyl group having 1 to 20 carbon atoms, X is a halogen atom and m is $0 < m < 4$. Examples of the vanadium compound used in the present invention include tetravalent vanadium compounds such as vanadium tetrachloride, vanadium tetrabromide, vanadium tetraiodide and tetraethoxyvanadium; pentavalent vanadium compounds such as vanadium oxytrichloride, ethoxydichlorovanadyl, triethoxyvanadyl and tributoxyvanadyl; and trivalent vanadium compounds such as vanadium trichloride and vanadium triethoxide.

To make the present invention more effective, the titanium compound and the vanadium compound are often used together. In this case, it is preferable that the V/Ti molar ratio be in the range of 2/1 to 0.01/1.

As examples of the organometallic compound used in the present invention, there may be mentioned organometallic compounds of Group I–III metals in the Periodic Table known as a component of Ziegler type catalysts. Particularly preferred are organoaluminum compounds and organozinc compounds, for example, organoaluminum compounds of the general formulae $R_3Al$, $R_2AlX$, $RAlX_2$, $R_2AlOR$, $RAl(OR)X$ and $R_3Al_2X_3$ wherein R, which may be alike or different, is an alkyl or aryl group having 1 to 20 carbon atoms and X is a halogen atom, and organozinc compounds of the general formula $R_2Zn$ wherein R, which may be alike or different, is an alkyl group having 1 to 20 carbon atoms, such as triethylaluminum, triisopropylaluminum, triisobutylaluminum, tri-sec-butylaluminum, tri-tert-butylaluminum, trihexylaluminum, trioctylaluminum, tridecylaluminum, diethylaluminum chloride, diisopropylaluminum chloride, diethylaluminum monoethoxide, ethylaluminum sesquichloride, diethylzinc, and mixtures thereof.

The order and method of intercontacting and reacting the following components used in the invention are not specially limited: (1) a compound obtained by treating an oxide of a Group II–IV element in the Periodic Table with a compound of the general formula $R^1_mSi(OR^2)_nX_{4-m-n}$, (hereinafter referred to simply as component [I]-(1)), (2) a reaction product of a magnesium halide and a compound of the general formula $Me(OR^3)_nX_{z-n}$, (hereinafter referred to simply as component [I]-(2)), (3) a compound of the general formula

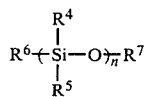

(hereinafter referred to simply as component [I]-(3)), and (4) a titanium compound and/or a vanadium compound (hereinafter referred to as component [I]-(4)).

As to the contacting order, the components may be intercontacted, for example, in the following order. First components [I]-(1) and [I]-(2) are contacted together, followed by contact therewith of component [I]-(3) and subsequently component [I]-(4), or first components [I]-(1) and [I]-(3) are contacted together, followed by contact therewith of components [I]-(2) and [I]-(4).

The contacting method is not specially limited, either. Known methods may be adopted. For example, the components may be reacted at a temperature in the range of 20° to 400° C., preferably 50° to 300° C., usually for 5 minutes to 20 hours in the presence or absence of an inert solvent; or the components may be reacted by a co-pulverization treatment, or by a combination of these methods.

Inert solvents which may be used in the invention are not specially limited. Usually, hydrocarbons and/or derivatives thereof not inactivating Ziegler type catalysts are employable, for example, various saturated aliphatic hydrocarbons, aromatic hydrocarbons and alicyclic hydrocarbons such as propane, butane, pentane, hexane, heptane, octane, benzene, toluene, xylene and cyclohexane, as well as alcohols, ethers and esters such as ethanol, diethyl ether, tetrahydrofuran, ethyl acetate and ethyl benzoate.

Where the reaction is performed by a co-pulverization treatment, conditions such as temperature and time for the co-pulverization can be decided easily by those skilled in the art according to the co-pulverization method used. In general, the co-pulverization is carried out at a temperature in the range of 0° to 200° C., preferably 20° to 100° C., for 0.5 to 50 hours, preferably 1 to 30 hours. Of course, the co-pulverizing operation should be performed in an inert gas atmosphere, and moisture should be avoided.

The most preferable order and method of contacting components [I]-(1), [I]-(2), [I]-(3) and [I]-(4) are as follows.

First, using a solvent which dissolves component [I]-(2), i.e., the reaction product of a magnesium halide and a compound of the general formula $Me(OR^3)_nX_{z-n}$, components [I]-(1) and [I]-(2) are reacted in the said solvent at a temperature in the range of 0° to 300° C., preferably 10° to 200° C., most preferably 20° to 100° C., for 1 minute to 48 hours, preferably 2 minutes to 10 hours. Preferred examples of such solvent are alcohols, tetrahydrofuran and ethyl acetate. In the above reaction, components [I]-(1) and [I]-(2) are intercontacted in such proportions as 0.01 to 5 grams, preferably 0.1 to 2 grams, of component [I]-(2) per gram of component [I]-(1). After the reaction, the solvent is removed to obtain a contacted product of both components.

Then, with the contacted product thus obtained is mixed and reacted component [I]-(3), i.e., a compound of the general formula

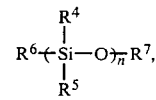

directly or in the presence of an inert solvent such as hexane, heptane, octane, benzene, or toluene, at a temperature of 20° to 400° C., preferably 50° to 300° C., for 5 minutes to 20 hours. The magnesium halide, the compound of the general formula $Me(OR^3)_nX_{z-n}$ and component [I]-(3) may be mixed and reacted simultaneously.

The contacted product of components [I]-(1) [I]-(2) and component [1]-(3) are intercontacted in such proportions as 0.01 to 5 grams, preferably 0.1 to 2 grams, of component [I]-(3) per gram of the contacted product of components [I]-(1) and [I]-(2).

With the contacted product of components [I]-(1), [I]-(2) and [I]-(3) thus obtained is then mixed component [I]-(4), i.e., a titanium compound and/or a vanadium compound, directly or in the presence of an inert solvent such as hexane, heptane, octane, benzene, or toluene, under heating at a temperature of 20° to 300° C., preferably 50° to 150° C., for 5 minutes to 10 hours, to support the titanium compound and/or the vanadium compound on the contacted product of components [I]-(1), [I]-(2) and [I]-(3). Preferably, the titanium compound and/or the vanadium compound of component [I]-(4) is mixed with the contacted product of components [I]-(1), [I]-(2) and [I]-(3) under heating at a temperature of 20° to 300° C., preferably 50° to 150° C., for 5 minutes to 10 hours in the absence of a solvent to support the titanium compound and/or the vanadium compound on such contacted product. In this case, the components [I]-(4) is used in such an amount as to give a titanium compound and/or vanadium compound content of the resultant solid component of 0.5 to 50 wt. %, preferably 1 to 20 wt. %. After completion of the reaction, unreacted titanium compound and/or vanadium compound is removed by washing several times with a solvent inert to Ziegler type catalysts, and then the solvent is evaporated under reduced pressure to obtain a solid powder.

As the organometallic compound component used in the present invention, there also may be used, in addition to the foregoing organometallic compound, a mixture or a reaction product of the organometallic compound with a compound of the general formula

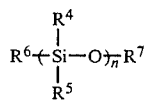

(hereinafter referred to as component [III]).

In the case of using a mixture of the organometallic compound and component [III], the organometallic compound and component [III] are used in the range of 1:0.001 to 1:5, preferably 1:0.01 to 1:2, in terms of organometallic compound:component [III] (molar ratio), and this mixture is used in such an amount as to give an Si:Ti and/or V ratio of 0.1:1 to 100:1, preferably 0.3:1 to 20:1, relative to the titanium compound and/or vanadium compound in the solid catalyst component [I].

In the case of using a reaction product of the organometallic compound and component [III], the organometallic compound and component [III] are reacted in such proportions as are in the range of 1:0.001 to 1:5, preferably 1:0.01 to 1:2, in terms of organometallic compound:component [I] (molar ratio), and this reaction product is used in such an amount as to give an Si:Ti and/or V ratio of 0.1:1 to 100:1, preferably 0.3:1 to 20:1, relative to the titanium compound and/or vanadium compound in the solid catalyst component [I].

The method of obtaining the reaction product of the organometallic compound and component [I] is not specially limited. Both may be contacted and thereby reacted at a temperature in the range of $-50°$ C. to $400°$ C., preferably $50°$ to $200°$ C., for 5 minutes to 20 hours, in the presence or absence of an inert solvent.

The amount of the organometallic compound used is not specially limited. Usually, the organometallic compound may be used in an amount of 0.1 to 1,000 mols per mol of the transition metal compound. Together with the organometallic compound there may be used an ester of an organocarboxylic acid such as benzoic, toluic or anisic acid.

The olefin polymerization reaction using the catalyst of the present invention is performed in the same way as in the conventional olefin polymerization reaction using a Ziegler type catalyst. That is, the reaction is performed in a substantially oxygen- and water-free condition, in vapor phase, or in the presence of an inert solvent, or using monomer or monomers per se as a solvent. Olefin polymerizing conditions involve temperatures ranging from $20°$ to $300°$ C., preferably $40°$ to $120°$ C., and pressures ranging from atmospheric pressure to 70 kg/cm$^2$·G, preferably 2 to 60 kg/cm$^2$·G. Adjustment of the molecular weight can be made to some extent by changing polymerization conditions such as polymerization temperature and catalyst mole ratio, but the addition of hydrogen into the polymerization system is more effective for this purpose. Of course, using the catalyst of the present invention, two or more multi-stage polymerization reactions having different polymerization conditions such as different hydrogen concentrations and different polymerization temperatures can be performed without any trouble.

The process of the present invention is applicable to the polymerization of all olefins that are polymerizable with Ziegler type catalysts. Particularly, it is suitable for the homo- or co-polymerization of $\alpha$-olefins having 2 to 12 carbon atoms, for example, the homopolymerization of such $\alpha$-olefins as ethylene, propylene, butene-1 and 4-methylpentene-1, as well as random and block copolymerizations of ethylene/propylene, ethylene/butene-1 and propylene/butene-1. Copolymerization with dienes for the purpose of modification of polyolefins is also preferable, e.g. ethylene/butadiene, ethylene/1,4-hexadiene, ethylene/ethylidene norbornene, and ethylene/vinyl norbornene.

The following examples are given to further illustrate the present invention, but it is to be understood that they are for illustration to practice the invention and that the invention is not limited thereto.

EXAMPLE 1

(a) Preparation of Solid Catalyst Component [I]

A three-necked 300-ml. flask equipped with a magnetic induction stirrer and a reflux condenser was purged with nitrogen and then charged with 20 g. of silica (Fuji-Davison #952) which had been calcined at $600°$ C. and 2.5 g. of tetraethoxysilane. After heat treatment at $80°$ C. for 2 hours, 5 g. of a reaction product obtained by reacting 10 g. of anhydrous magnesium chloride with 4.2 g. of aluminum triethoxide by ball milling and 150 ml. of tetrahydrofuran were added and reaction was allowed to take place at $60°$ C. for 1 hour, followed by drying at $120°$ C. under reduced pressure to remove tetrahydrofuran. After subsequent addition of 100 ml. of hexane and stirring, 10 g. of tetraethoxysilane was added and reaction was allowed to take place for 2 hours under reflux of hexane to obtain a solid powder (A).

Then, 50 ml. of titanium tetrachloride was added to the solid powder (A) and reaction was allowed to take place at $120°$ C. for 1 hour. The reaction mixture was washed with hexane until titanium tetrachloride was no longer recognized in the hexane, to obtain a solid catalyst component [I]. The titanium content per gram of the solid catalyst component was 21 mg.

(b) Polymerization

A stainless steel autoclave was used as an apparatus for vapor phase polymerization, and a loop was formed by using a blower, a flow control device and a dry cyclone. The temperature of the autoclave was adjusted by passing warm water through its jacket.

Into the autoclave held at $80°$ C. were fed the solid catalyst component I prepared above and triethylaluminum at the rates of 50 mg/hr and 5 mmol/hr, respectively. Further, butene-1, ethylene and hydrogen gases were fed while adjusting the butene-1/ethylene mol ratio in the vapor phase in the autoclave to 0.18 and the hydrogen concentration to 20% of the total pressure, and polymerization was allowed to take place while recycling the intra-system gases by the blower to maintain the total pressure at 10 kg/cm$^2$·G. As a result, there was obtained an ethylene copolymer having a bulk density of 0.40, a melt index (MI) of 1.2 and a density of 0.9216. Catalytic activity was 173,000 g.copolymer/g·Ti.

After a continuous run for 10 hours, the auto-clave was opened and its interior was inspected, which was found to be clean with no polymer adhered to the inner wall and the stirrer.

F.R. value (F.R.=$MI_{10}/MI_{2.16}$) represented in terms of the ratio of a melt index $MI_{10}$ of the copolymer determined at a load of 10 kg. to a melt index $MI_{2.16}$ thereof determined at a load of 2.16 kg. both at 190° C. according to the method defined by ASTM-D1238-73, was 6.9. Thus, the molecular weight distribution was very narrow.

A film formed from this copolymer was extracted in boiling hexane for 10 hours and then determined for its hexane extraction which was found to be 0.6 wt. % and thus very small.

The copolymer had a spherical particles and an average particle diameter of 860 μm, with no fine particles below 100 mesh, and it was extremely superior in fluidity.

COMPARATIVE EXAMPLE 1

A catalyst component was prepared in the same way as in Example 1-(a) except that silica was not treated with tetraethoxysilane, and a continuous vapor phase copolymerization of ethylene and butene-1 was carried out in the same manner as in Example 1-(b). As a result, there was obtained an ethylene copolymer having a bulk density of 0.37, a melt index (MI) of 1.4, a density of 0.9252 and an average particle diameter of 810 μm. Catalytic activity was 165,000 g.copolymer/g.Ti and the F.R. value of the copolymer was 7.4. Then, a film formed from this copolymer was extracted in boiling hexane for 10 hours and then determined for its hexane extraction, which was found to be 0.9 wt. %.

EXAMPLES 2–6

Catalysts were prepared in the same way as in Example 1-(a) except that there were used such compounds as shown in Table 1 below for the treatment of silica, and using those catalysts there were performed copolymerizations of ethylene and butene-1, the results of which are as set out in Table 1.

TABLE 1

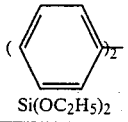

*1 Fuji-Davison #952
*2 Ketjen F7, a product of Akzo Chemie

EXAMPLE 7

Using the solid catalyst component [I] obtained in Example 1, copolymerization was conducted in the same way as in Example 1 except that tetraethoxysilane was further added at the rate of 0.1 mmol/hr during the copolymerization. As a result, there was obtained an ethylene copolymer of spherical particles having a bulk density of 0.42, a melt index (MI) of 0.6 and a density of 0.9250. Catalytic activity was 127,000 g. copolymer/g-.Ti.

After a continuous run for 10 hours, the auto-clave was opened and its interior was inspected. The inner wall and the stirrer were free from polymer adhesion.

The F.R. value of the copolymer was 6.7 and thus the molecular weight distribution was extremely narrow. When a film formed from the copolymer was extracted in boiling hexane, its hexane extraction was as small as 0.3 wt. %. The copolymer had an average particle diameter of 900 μm, with no fine particles below 100 mesh, and it was extremely superior in fluidity.

EXAMPLES 8–10

Solid catalyst components were prepared in the same way as in Example 1-(a) except that the compounds shown in Table 2 were used as oxides in place of silica, and using those solid catalysts components there were performed copolymerizations in the same manner as in Example 7, the results of which are as set out in Table 2.

EXAMPLES 11–13

Solid catalyst components were prepared in the same way as in Example 1-(a) except that the compounds shown in Table 3 were used as compounds of the general formula $Me(OR^3)_nX_{z-n}$ in the component [I]-(2) in place of aluminum triethoxide, and using those solid catalyst components there were performed copolymerizations in the same way as in Example 7, the results of which are as set out in Table 3.

TABLE 2

| Example | Oxide in Component [I]-(1) | Catalytic Activity g.copolymer/g.Ti | MI g/10 min | F.R. | Density g/cm³ | Bulk Density g/cm³ | Hexane Extraction wt. % | Average Particle Diameter μm |
|---|---|---|---|---|---|---|---|---|
| 8 | Al₂O₃ (Ketjen B, a product of Akzo Chemie) | 157,000 | 1.0 | 7.1 | 0.9223 | 0.39 | 0.6 | 690 |
| 9 | Al₂O₃·SiO₂ (Ketjen LAC 25, a product of Akzo Chemie) | 162,000 | 0.7 | 7.0 | 0.9241 | 0.41 | 0.5 | 730 |
| 10 | MgO·Al₂O₃ (*1) | 151,000 | 0.8 | 7.1 | 0.9250 | 0.40 | 0.6 | 710 |

(*1) — CMA-1.25, a product of Kyowa Chemical Co.

TABLE 3

| Example | Me(OR³)$_n$X$_{z-n}$ in Component [I]-(1) | Catalytic Activity g/copolymer/g.Ti | MI g/10 min | F.R. | Density g/cm³ | Bulk Density g/cm³ | Hexane Extraction wt. % | Average Particle diameter μm |
|---|---|---|---|---|---|---|---|---|
| 11 | Mg(OC₂H₅)₂ | 137,000 | 0.9 | 6.6 | 0.9251 | 0.43 | 0.2 | 810 |
| 12 | B(OC₂H₅)₃ | 121,000 | 0.9 | 6.7 | 0.9249 | 0.42 | 0.3 | 800 |
| 13 | B(OC₂H₅)₂Cl | 116,000 | 1.1 | 6.7 | 0.9230 | 0.42 | 0.3 | 870 |

EXAMPLE 14

1,000 ml. of hexane, 1 mmol. of triethylaluminum and 0.2 mmol. of diphenyldiethoxysilane were placed in a stainless steel 2-liter autoclave equipped with a stirrer and were reacted at 80° C. for 30 minutes under stirring. Thereafter, the temperature was lowered to room temperature and 20 mg. of the solid catalyst component [I] obtained in Example 1 was added, then the temperature was raised to 90° C. The system was pressurized to 2 kg/cm²·G by the vapor pressure of hexane, then hydrogen was introduced to a total pressure of 4.1 kg/cm²·G and thereafter ethylene was introduced continuously to maintain the total pressure at 10 kg/cm²·G, under which condition polymerization was carried out for 1 hour. Thereafter, the resultant polymer slurry was transferred into a beaker and hexane was removed under reduced pressure to yield 63.3 g. of a white polyethylene of spherical particles having a melt index (MI) of 1.0, a bulk density of 0.45 and a density of 0.967. Catalytic activity was found to be 536 g. polyethylene/g.solid·hr·C₂H₄ pressure, 25,200 g. polyethylene/g.Ti·hr·C₂H₄ pressure. The average particle diameter of the polymer was 820 μm, and the proportion of fine particles below 100 mesh was as small as 0.02 wt. %. The polymer was extremely superior in fluidity.

What is claimed is:

1. A process for preparing a polyolefin, comprising polymerizing at least one olefin in the presence of a catalyst, which catalyst comprises a combination of the following components [I] and [II]:

[I] a solid component obtained by intercontacting and reacting the following components (1) through (4):

(1) a compound obtained by treating an oxide of an element of Groups II–IV in the Periodic Table with a compound represented by the general formula $R^1_mSi(OR^2)_nX_{4-m-n}$, used in an amount of 0.0001 to 2 mol per gram of the oxide of an element of Groups II–IV and heating them at a temperature in the range of 0° C. to 500° C. from 10 minutes to 24 hours, wherein $R^1$ and $R^2$ being each a hydrocarbon radical having 1 to 24 carbon atoms, a hydrocarbon radical having 1 to 18 carbon atoms containing oxygen, sulfur or nitrogen, or hydrogen, X being a halogen atom, m being $0 \leq m < 4$ and n being $0 \leq n \leq 4$, provided $0 \leq m+n \leq 4$, (2) a reaction product obtained by the reaction of a magnesium halide and a compound represented by the general formula $Me(OR^3)_nX_{z-n}$, where the reaction ratio of the magnesium halide and the compound of the general formula $Me(OR^3)_nX_{z-n}$ being in the range of 1:0.05 to 1:1 in terms of Mg:Me molar ratio, wherein Me, being Na, Mg, Ca, Zn, Cd, Al, B, Ga, Ge, Sn, P, Cr, Mn, Fe, Co, or Ni, with the limitation that silicon, titanium and vanadium being excluded, $R^3$ being a hydrocarbon radical having 1 to 24 carbon atoms, X being a halogen atom, z being the valence of Me, and n being $0 < n \leq z$, (3) a compound represented by the general formula

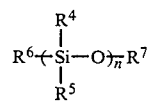

wherein $R^4$, $R^5$ and $R^6$ being each a hydrocarbon radical having 1 to 24 carbon atoms, an alkoxy group, hydrogen, or a halogen atom, $R^7$ being a hydrocarbon radical having 1 to 24 carbon atoms, and n being $1 \leq n \leq 30$, and (4) a titanium compound and/or a vanadium compound;

wherein conditions for the intercontacting and reacting of components (1) through (4) being:

(i) intercontacting 0.01 to 5 grams of component (2) per gram of component (1) and at a temperature of 20° to 400° C.; (ii) reacting 0.01 to 5 grams of component (3) per gram of the contacted product of components (1) and (2); and (iii) reacting that reaction product with 1 to 20 wt. % of the titanium compound and/or vanadium compound of component (4); and an organometallic compound.

2. The process according to claim 1, wherein the element of Groups II–IV in the Periodic Table in the component [I]-(1) being selected from the group consisting of Mg, Ca, Zn, B, Al, Si and Sn.

3. The process according to claim 1, wherein said olefin being an α-olefin having 2 to 12 carbon atoms.

4. The process according to claim 1, further comprising carrying out the polymerization reaction at a temperature in the range of 20° to 300° C. and at a pressure in the range of atmospheric pressure to 70 kg/cm$^2$·G.

5. The process according to claim 1, wherein said catalyst further comprises the combination of said component [I], said component [II] and the following component [III]:

[III] a compound represented by the general formula

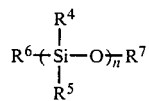

wherein $R^4$, $R^5$ and $R^6$ being each a hydrocarbon radical having 1 to 24 carbon atoms, an alkoxyl group, hydrogen, or a halogen atom, $R^7$ being a hydrocarbon radical having 1 to 24 carbon atoms, and n being $1 \leq n \leq 30$.

6. The process according to claim 5, further comprising said components [II] and [III] being used as a mixture or reaction product of both component [II] and [III] being used in the range of 1:0.01 to 1:2 in terms of [II]:[III] molar ratio to give a Si:Ti and/or V ratio of 0.1:1 to 100:1 relative to the titanium compound and/or vanadium compound in solid catalyst component [I].

* * * * *